Figure 1:
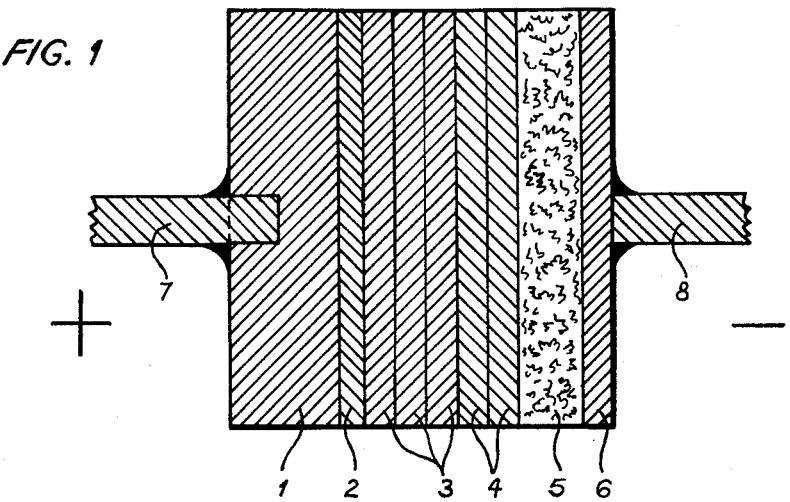

Sept. 11, 1962    M. WAGNER ET AL    3,054,029
ELECTRICAL CONDENSER
Filed Oct. 24, 1958

INVENTORS
M. WAGNER
M. KOLB
BY
Robert Harding Jr
ATTORNEY

United States Patent Office 3,054,029
Patented Sept. 11, 1962

3,054,029
ELECTRICAL CONDENSER
Manfred Wagner, Nurnberg, and Max Kolb, Schwabach, Germany, assignors to International Standard Electric Corporation, New York, N.Y., a corporation of Delaware
Filed Oct. 24, 1958, Ser. No. 769,396
Claims priority, application Germany Oct. 26, 1957
4 Claims. (Cl. 317—230)

This invention relates to an electrical condenser or capacitor comprising a metallic coating, consisting in particular of an anodically oxidizable or film-forming metal, such as tantalum, aluminium, or the like, or which is coated therewith, further consisting of a dielectric layer arranged thereupon, preferably consisting of a conversion product of the coating or film metal, further of a second coating of an electrically well-conducting material and of a layer arranged between the dielectric and the second coating, comprising one or more electronically conductive compounds. Furthermore the invention relates to methods of producing such capacitors which are featured by low dielectric losses, by a high break-down resistivity, a high specific capacity, and unchangeability of the losses as well as of the capacity during operation.

Electrical capacitors are already known according to the prior art in which a metallic coating has applied to it a dielectric layer of an oxide of the coating metal, whereupon a counter coating of a well-conducting chemical compound or a coating containing such compound is then applied, which counter coating will easily evolve oxygen in the case of a breakdown. To this end higher metal oxides of good conductivity are employed, for example, the oxides of lead or nickel, which are supposed to effect a healing of the damages occurring during the manufacture and operation of the capacitor, in other words which are supposed to effect the healing of the oxide layer by evolving oxygen. The application of the counter coating is accomplished in such a way that first of all nickel or lead is applied in the form of a thin layer upon the dielectric, e.g. by way of evaporation or galvanic precipitation, and then this layer is oxidized, for instance, by way of an anodic oxidation in an electrolytic bath, so that an oxygen compound is produced which will easily evolve oxygen.

In a further conventional embodiment the capacitor comprises a sintered anode body consisting of an anodically oxidizable or film-forming metal, such as aluminium, tantalum, tungsten, or any other similar metal which is coated with the dielectric layer, e.g. by way of an anodic oxidation. A semiconducting layer consisting of a higher metal oxide, such as lead, nickel or manganese, is applied to the dielectric layer. This semiconducting layer is produced by saturating or impregnating the base with a solution changing over into the corresponding oxide upon heating, and, by means of a subsequent heat treatment, if so required, by repeating these steps several times until the desired thickness is obtained. If the semiconducting layer consists e.g. of manganese dioxide, then this coating may be produced by a thermal decomposition of a manganese nitrate solution.

This embodiment further comprises an electrically well-conducting coating of graphite on the semiconducting layer which is applied in the form of an aqueous suspension upon the semiconducting layer and is then heated until the aqueous components are volatilized. As is well known from other elements of this kind the graphite coating is supposed to establish an intimate electrical contact with the semiconducting layer.

A device manufactured or produced in this way is enclosed in a metallic housing which is in an electrical connection with the conductive graphite coating. This can be accomplished by applying a metal layer by way of spraying on the graphite layer. One of the electrical connections is provided at the metal housing, while the other one is embedded in the sintered electrode and is led in an insulated manner through the housing towards the outside.

Furthermore, electrical capacitors are known comprising a dielectric consisting of an oxide layer of the coating metal and of an intermediate layer consisting of other semiconducting materials, such as copper sulphide, a mixture of copper (I)- and copper (II)-sulphide, or of a mixture of copper iodide with iodine. For the purpose of healing any damages of the oxide layer which are likely to occur during the manufacture and the operation of the capacitor, the semiconducting layer is provided with an admixture of a substance which easily evolves oxygen, such as potassium chlorate, potassium permanganate or barium peroxide.

Capacitors of the conventional type are known to bear quite a number of disadvantages; for example, they do not meet the requirement of stability of the capacity and of the losses, as well as the requirement for an absolute breakdown resistivity. By way of example, it is one feature of the conventional types of capacitors that, when employing a semiconducting layer of a higher metal oxide, this will be converted at the occurrence of breakdowns and under evolving oxygen, into a lower metal oxide which often represents a good insolator, so that the previously well-conducting semiconductor layer will now become nonconductive. Uncontrollable and nonadmissible operating conditions are caused by a substantial increase of the current density and of the transition resistance, which is followed by a considerable increase of the losses and consequently by an overheating. Furthermore, and in the case of capacitors of such type, the danger exists that in the case of a repeated breakdown at one point, due to the very thin thickness of the layers, contacts between the coatings are likely to occur which are the cause of a complete short-circuit. A further disadvantage resides in the fact that e.g., in the conventional types of capacitors the requirement for a temperature response as small as possible is not met.

It is the object of the present invention to eliminate these and other disadvantages and to considerably increase the serviceability of such capacitors.

Capacitors, according to the invention, consisting of or being coated with a metallic layer, in particular an anodically oxidizable or film-forming metal, such as tantalum, aluminium, or the like, with a dielectric layer applied thereto, preferably of a conversion product of the coating or covering metal, and a second coating of a material having good electrical conductivity and a layer arranged between the dielectric and the second coating containing or consisting of one or more electronically conducting compounds, are characterized by this intermediate layer being composed of partial layers which, from layer to layer, either in a stepwise manner or continuously, have different physical and/or chemical properties.

The substances or materials which are used in capacitors according to the invention, chiefly consist of electronically conductive compounds. When selecting the materials for the individual partial layers care will have to be taken that no barrier layers are formed between the partial layers. To this end the partial layers preferably have to be of such kind that they all are of the same conductivity type.

The variety regarding the properties of the partial layers may be realized in that these are produced from different electronically conducting compounds. However, it is also possible that individual partial layers consist of homogeneous mixtures of such compounds and/or of modifications having a different lattice structure of the same compound. If so desired, the respective compounds may contain one or more foreign additives and/or doping substances which are adapted to meet the particular requirements.

Appropriately the arrangement of the layers is made in such a way that at least one partial layer is produced from a plurality of successively applied layers of the same composition. According to this arrangement, any possibly existing imperfections of the first layer are covered to a high degree of probability by the second layer, and overstrained points are avoided during the passage of current, because holes or thin portions in the layer may be the cause of a complete short-circuit.

Because of the presence of several partial layers of different composition (by this is meant, in the following, a difference in the material and/or stoichiometric composition), the loss angle of the capacitor is held at a low constant value. Furthermore, and because the intermediate layer is no longer of a uniform composition, the danger that the dielectric layer is completely short-circuited at individual points is eliminated.

According to the invention, these advantages are achieved by composing the intermediate layer of partial layers having different electrical conductivity values ranging between $10^{-1}$ and $10^4$ mho./cm.$^{-1}$, and providing the outwardly arranged partial layer, compared with the other partial layers, with a substantially lower electrical conductivity to serve as a resistance layer. This layer is arranged as a series resistance between the coatings. Accordingly, the resistance layer will act in such a way that, in the event of a damage of the dielectric layer, a high resistance is effectively connected in parallel to the capacitor, so that the electrical properties of the capacitor will practically not be affected.

As regards the choice of the material and the manufacture of the resistance layer, sufficient liberties are permitted. Appropriately, the resistance layer is produced of hard, resistive material e.g. of poorly conducting metallic oxides which, as is well known, are easy to be affected with respect to their electronic conductivity by the action of oxygen. These, as well as the other partial layers, may consist e.g. of reduction semiconductors, whose conductivity is the greater the less metalloid is contained in the compound. In order that the conductivity of the resistance layer will be reduced, some metalloid will have to be added. For this reason, and when employing a reduction semiconductor of a metallic oxide, the partial layers may be produced in such a way that, in the course of several steps, of the process, the oxide layers of the reduction semiconductor are applied in accordance with a conventional method until reaching the desired thickness, e.g. by dipping or immersing it into the solution of a suitable chemical compound and a subsequent thermal decomposition, which process is then followed by a tempering under a sufficiently high pressure of oxygen. The thus produced layer will then contain partial layers of a different ohmic resistance when preventing the formation of barrier layers, and an outer layer of a higher resistance will be obtained.

However, the layer of metallic oxide may also be produced by the evaporation of a metal and a subsequent oxidation, e.g. tempering within a defined atmosphere of oxygen, or anodic oxidation in a suitable electrolyte. When employing this kind of manufacture the process of formation, i.e. of forming the layer of oxide, after some time, will only progress very slowly. Upon terminating this process in good time, layers will be obtained having on the outside a substantially higher content of oxygen than on the inside. Therefore, when employing reduction semiconductors for manufacturing the partial layers, these will have an inner zone of a good conductivity. The zones of a higher conductivity will then be preceded by a layer of a poor conductivity.

When employing oxidation conductors these may be tempered after application within a definitely reducible gas atmosphere. In this case care will have to be taken that a progressive metallization of the oxide surface will not take place. When effecting a reduction of oxygen of the layer within a gas atmosphere, care will have to be taken that no further oxygen will penetrate into the layer until the counter coatings are applied.

A further possibility regarding the manufacture of partial layers with different conductivity consists in the employment of different electronically conducting compounds, in particular semiconducting chemical compounds and such ones having metallic conductivity. However, since the conductivity of these compounds is no material constant, and because a definite compund cannot be said to have a specific resistance, this kind of manufacture is not quite so simple. However, the conductivity may be influenced by the addition of doping substances and/or foreign substances in the desired manner. For producing the required conductivity, homogeneous mixtures of electronically conducting compounds may also be used.

For facilitating the current transition from the resistance layer to the second coating of the capacitor, an intermediate layer, e.g. of graphite, may be applied to the resistance layer in the conventional layer upon which, thereafter (as is likewise known according to the prior art), the metal of the second coating is sprayed. It is within the scope of the invention to employ instead of a graphite layer a layer of noble metal, because during the evaporation of a noble metal, no inadmissible variation of the content of metalloid at the outside of the vaporated partial layer will appear.

As a rule, when employing a resistance layer according to the invention, no short-circuits will occur between the layers in the event of a breakdown, especially when the thickness of the resistance layer is chosen so that it cannot be subjected to a breakdown by any of the voltages practically encountered in use. However, the danger of a complete short-circuit may still further be reduced by making the counter coating applied to the graphite layer so thin that the coating will burn away in the event of a very strong breakdown.

In the case of electrical capacitors employing a dielectric consisting of a product of conversion of an electrode metal, another possibility still exists of healing the damages or injuries of the dielectric layer which are likely to occur during the manufacture or operation of the capacitor. This is accomplished by making at least the dielectric layer which is adjacent to the partial layer of such a type that, upon heating, it will evolve a regenerating component, i.e. a component regenerating the dielectric layer, which will effect a self-healing of parts which are either subjected to a breakdown or are mechanically damaged. For example, if the dielectric is formed by an oxide layer, then the partial layer adjacent to the dielectric layer will be capable of evolving oxygen in the event of a breakdown. To this end a metallic oxide may be used which willingly changes over to a lower stage of valency, and which serves as an oxygen reserve in case the dielectric layer should become subject to a breakdown. Suitable oxides are the oxides of manganese or of iron, or superoxides, such as lead peroxide and barium peroxide. The partial layer lying on the dielectric layer may consist of such a metallic oxide. However, a homogeneous mixture of such oxygen-evolving metallic oxides may be used. A further and particularly advantageous possibility consists in adding to the respective partial layer one or more foreign substances easily evolving oxygen. To this end, additives e.g. of potassium chlorate and potassium permanganate have proved to be suitable. In this case one still has the benefit of the added advantage that by means of additives the conductivity of the partial layers can be adjusted at will.

Besides requiring a high dielectric constant, a high insulation resistance and a small loss angle, a substantial demand which has to be placed on an electrical capacitor is that the capacity be subjected as little as possible to variations in the case of temperature fluctuations. Capacitors with a low temperature response of the capacity are of importance above all to telephone applications.

This requirement is not met by the conventional capacitors employing a semiconducting layer between the coatings. This is due to the fact that, as is well known, semiconducting compounds have a more or less strongly distinguished temperature coefficient of conductivity.

According to the invention, the detrimental influence of temperature variations upon the capacity is practically eliminated. Also in all cases where a certain temperature-dependence of the capacity is desirable, the layer system according to the invention may be used. To this end, it is proposed to produce the intermediate layer of partial layers with different temperature-dependences of the electrical conductivity, especially of opposite dependences, and to carry out the structure of the layers in such a way that a previously determined temperature-dependence will result, in particular a temperature independence of the capacity within the working temperature range.

A capacitor, according to the invention, is produced e.g. in such a way that a first partial layer with a positive temperature coefficient of the electric conductivity is used, while the second partial layer has a negative temperature coefficient, and this is followed by a partial layer having a positive temperature coefficient, and so forth. Materials for the partial layers may be electronically conducting compounds with an approximately metallic conductivity and a negative temperature coefficient, as well as compounds with semiconductor properties having a positive temperature coefficient. In cases where it is desirable to produce e.g. a capacitor comprising two partial layers, this is carried out appropriately in such a way that first two substances having opposite temperature coefficiencies as well as corresponding conductivities for the partial layers are selected, which are then applied in accordance with a suitable method. By suitably selecting different materials with the required properties, it is also possible to obtain, within certain limits, a desirable dependence of the capacity on temperature.

In further embodying the idea of the invention and for producing an electrical capacitor having a predeterminable temperature-dependence or independence of its capacity, each partial layer may consist of materials having a different, in particular temperature dependence. Procedure may be carried out in such a way that substances whose temperature coefficient is different or particularly opposite from that of the respective partial layer are added to each partial layer.

Since it is possible by the employment of several partial layers of a different composition, according to the invention to produce electrical capacitors having an increasing temperature-capacity characteristic, and ones with a constant as well as ones with a decreasing temperature-capacity characteristic without affecting the otherwise desirable properties, the capacitor, in further embodying the invention, may also be composed of a plurality of single capacitors, of which a number is equipped with partial layers having a positive, and others having a negative, temperature coefficient. By means of a suitable parallel- or series-connection of such single capacitors, a capacitor will then be obtained whose capacitance is independent of temperature variations. By means of a suitable combination, a previously determinable characteristic may also be achieved.

Further details of the invention relate to methods of producing such capacitors. The individual steps of the process will now be described in the following with reference to some examples.

Capacitors, according to the invention, are chiefly used in two different types, namely as wire- or foil-type capacitors with a roughened electrode, and as capacitors having porous sintered electrodes. The latter bears the advantage of providing a large capacity in a small space. With these types of capacitors it is particularly suitable to employ tantalum as a film-forming electrode metal. In producing the sintered tantalum body, a tantalum powder of high purity and of a corresponding size of grain, together is sintered together at a temperature ranging below the melting point and under pressure to form an extremely porous body. On the surface of the tantalum a thin layer of tantalum oxide is produced e.g. by means of an anodic oxidation, the thickness of which is dependent upon the formation voltage employed. To the oxide film is applied a layer of an electronically conducting compound having the ability of evolving oxygen in the event of a breakdown, so that a self-healing of the points in the dielectric layer where the breakdown has occurred will be effected. As suitable materials, higher oxides, e.g. of lead, nickel, iron or manganese may be used.

A very substantial demand of that partial layer which has been applied as the first one, is that its resistance be as low as possible. Furthermore this layer will have to be applied in accordance with methods enabling the substance or material to penetrate into the numerous channels of the sintered body. Only in such a way is it possible to realize a substantial increase of the capacity of the capacitor by avoiding increased losses; because with this increase in capacity at the employment of sintered electrodes, the difficulty will also arise that the resistance of the first partial layer, in view of the great number of thin threads of material, will play an important role which may not be neglected. If, therefore, it is intended to substantially reduce the losses and, consequently, the danger of causing overheating, a partial layer having a very low resistance will have to be employed. One suitable method of applying the first partial layer, for example, consists in impregnating the base with a chemical solution which is converted into the corresponding oxide when heated, and subjecting it subsequently to heat treatment. In this case the procedure may be started e.g. from carbonates, nitrates or from other compounds which are converted into oxides when heated. A further process consists in applying the material in a powdered condition and mixed with a binding solution, e.g. the solution of a binding agent, as a thin layer upon the dielectric layer, and heating until the components of the binding agent have become volatilized. For facilitating the penetration of the solution or of the liquid mixture into the numerous channels of the sintered body it is appropriate to remove the grease from the base and to degasify the base in a vacuum prior to the application of the first partial layer. Also the application itself is carried out in the vacuum, so that a coating free of air bubbles will result. By repeating the above steps of the process several times, the partial layer may be produced in the desired thickness and without any imperfections. At least, however, it is of advantage to apply the partial layer, which is immediately adjacent to the dielectric layer, mechanically. The remaining partial layers may be applied in accordance with any other method, e.g. by the evaporation of metal and a subsequent oxidation.

For producing the partial layer serving as a series resistance between the coatings of the capacitor, so that the layer of metallic oxide and the resistance layer will lie upon each other and will be firmly connected with each other, various methods may be used. One of these methods consists in a heat treatment either during and/or after the application of the last layer of metallic oxide within a defined atmosphere of oxygen or within a reducing gas atmosphere, depending on whether a reduction semiconductor or an oxidation semiconductor is involved. When employing a reduction semiconductor, the application of the last partial layer will appropriately be carried out in such a way that it is produced by the evaporation of metal and by a subsequent oxidation. In this way the layer of oxide on its outside will have a substantially higher content of oxygen than on its inside, so that on the outside there will be a zone of poor conductivity, and on the inside a zone of good conductivity. In this case, however, care will have to be taken that the oxidation may not progress until a higher phase of oxide is formed. The oxidation may only consist in a variation of the relative content of oxygen of the oxide phase. Another process of manufacturing consists of anodic electrolytic oxidation. The employment of oxidation semiconductors is likewise possible when considering that these will show a reduction in their conductivity upon reducing the content of their oxygen. In such a case the oxide will be treated with reducing substances without causing a reduction to take place down to the metal phase.

However, it is also possible to take another course and apply a further partial layer of a material having a lower conductivity subsequently to the production of the oxide layers.

To this end, various possibilities are available. In addition thereto the conductivity may still be affected by the addition of doping substances in the desired manner, or else homogeneous mixtures of suitable substances for adjusting the conductivity may be employed. For producing the resistance layer, suitable oxides are used, e.g. slightly conducting metallic oxides, such as the oxides of titanium, vanadium, zinc, tin or iron, the highest values of the specific conductivity of which range in the order of magnitude of $10^1$ mho/cm.$^{-1}$. The oxides of metal are particularly suitable for employment due to their hardness and resistivity with respect to mechanical damage. When selecting these materials, care will have to be taken that no barrier layers are formed between the partial layers. The process of application may be carried out in accordance with one of the above mentioned methods. The thickness of the layers may be chosen so that the layer is incapable of being punctured by any of the voltages usually occurring.

This embodiment, employing partial layers of a different composition, still meets another requirement which has to be placed on a capacitor, namely that the resistance of the partial layers is subjected as little as possible to variations caused by temperature fluctuations. On account of this, the losses which are actually very low will also remain constant throughout a larger range of temperature.

In accordance with the invention, partial layers are used having resistances which vary oppositely with temperature. By means of a suitable layer structure, the capacitance may be made independent of temperature within the range of the working temperature. There will be no great difficulty in selecting the right one out of the great number of electronically conducting compounds. For example, it is well known that compounds with a metallic conductivity lying between $10^2$ and $10^4$ mho/cm.$^{-1}$ have a negative temperature coefficient, and compounds with semiconductor properties and conductivity between $10^{-10}$ and 1 mho/cm.$^{-1}$ have a positive temperature coefficient. In the case of compounds having conductivities lying in the transition range of $1$–$10^2$ mho/cm.$^{-1}$ the temperature coefficient of the conductivity may be positive as well as negative. In the case of partial layers consisting of different compounds, it is possible to use as the first partial layer e.g. a lead oxide having a negative temperature coefficient and a high conductivity, and as a second partial layer tin oxide having a positive temperature coefficient and a small conductivity.

Instead of partial layers consisting of different materials, partial layers consisting of homogeneous mixtures of electronically conducting compounds may be used with resistances varying oppositely with temperature.

The application of the counter electrode is carried out subsequently to the manufacturing of the partial layers of the dielectric layer. Here substances or methods may not be employed which would have a detrimental influence upon the partial layers. When employing layers of metal oxides as partial layers e.g. any substances having a reducing effect, such as base metals, they may not be evaporated or sprayed at a higher temperature. Of course, it is possible to use evaporated layers of noble metal. Good results are obtainable with a layer of graphite onto which a metallic electrode is applied. The layer of graphite will then also serve the purpose of reducing the transistion resistance between two existing layers. The application of the graphite layer is carried out in the conventional manner e.g. in the form of an aqueous suspension which is followed by a heat treatment until the aqueous components are volatilized. The second metallic electrode, which may at the same time form the casing of the capacitor, may be a coating produced by means of spraying e.g. an alloy of lead or tin. The thus sprayed-on metal coating is particularly suitable due to its low manufacturing costs. In addition thereto the requirement may also be met for a structural element as small as possible as has been mentioned hereinbefore. The metal counter coating may be so thin as to burn away in the case of a strong breakdown.

A device of this type, when the film-forming metal acts as the anode, and when inserted in a circuit, will have the property of presenting a high resistance to the circuit.

The examples hereinbefore mentioned have been given to provide a better understanding of the idea of invention and are in no way intended to serve as a limitation with respect to the scope of the invention. The same is applicable to the type of embodiment of an electrical capacitor as shown in the accompanying drawing, which merely serves the explanation of the invention.

Figure 2:
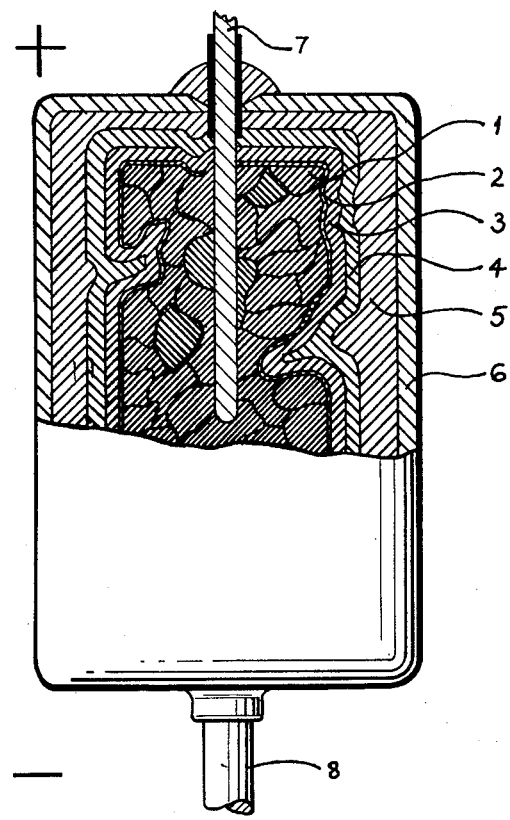

In FIG. 1 the layer structure of a capacitor according to the invention is shown in a purely schematic manner, and in FIG. 2 a cross-sectional view of such a capacitor is shown.

In the accompanying drawings the reference 1 denotes the anode consisting of a film-forming metal, e.g. tantalum, in the form of a porous sintered body. A thin layer 2 of tantalum oxide is applied to the surface of the tantalum by means of an anodic oxidation. The dielectric layer 2 is coated with an electronically conducting layer 3 capable of easily evolving oxygen and having a good conductivity. To this end, lead oxide may be used. This partial layer is applied in the form of several layers, e.g. in FIG. 1 it is supposed to consist of three layers. Thereupon the resistance layer 4 is arranged, serving as a series resistance which, under certain circumstances, may consist of two or more layers of the same kind, likewise of an electronically conducting compound, such as of a metallic oxide, e.g. the oxide of tin, having in particular a temperature coefficient of the electric resistance extending oppositely to that of the layer 3. This is followed by a graphite layer 5 which is in an intimate electrical contact with the layers 4. Reference 6 denotes the counter electrode which is applied either by evaporation or spraying. Of the electrode lead in conductors, which are denoted by the references 7 and 8, one is embedded in the sintered body and is led outwardly in an insulated manner through the casing 6. The other electrode lead-in conductor is mounted directly on the casing, and is connected therewith electrically.

The embodiment of a capacitor employing several partial layers with a different composition, according to the invention and shown in the accompanying drawings merely shows the principle of the construction, which may be varied in many ways in accordance with the specification.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An electrical capacitor comprising a base of an anodically oxidizable metal, a dielectric layer on said base of a product of conversion of said base metal, an intermediate layer of electronically conducting material on said dielectric layer, and a layer of conducting material on said intermediate layer, said intermediate layer comprising a plurality of partial layers, each of said partial layers comprising a semiconducting compound of the same conductivity type to avoid the formation of barrier layers therebetween, at least two of said compounds having temperature coefficients of opposite sign.

2. An electrical capacitor, as claimed in claim 1 in which the partial layer which is immediately adjacent to the dielectric layer has a higher electrical conductance value than the others.

3. An electrical capacitor as claimed in claim 1 further comprising a layer of carbon between said intermediate layer and said layer of conducting material.

4. An electrical capacitor as claimed in claim 1 characterized in that one of said semiconducting compounds has metallic conductivity properties and a negative temperature coefficient and another has semiconducting properties with a positive temperature coefficient.

References Cited in the file of this patent

UNITED STATES PATENTS

| | | |
|---|---|---|
| 1,261,711 | Creighton | Apr. 2, 1918 |
| 1,510,173 | Hosenfeld | Sept. 30, 1924 |
| 1,847,653 | Jones | Mar. 1, 1932 |
| 1,906,691 | Lilienfeld | May 2, 1933 |
| 2,005,279 | Van Geel | June 18, 1935 |
| 2,195,245 | Glaser | Mar. 26, 1940 |
| 2,299,228 | Gray | Oct. 20, 1942 |
| 2,862,156 | Ruben | Nov. 25, 1958 |
| 2,936,514 | Millard | May 17, 1960 |

FOREIGN PATENTS

| | | |
|---|---|---|
| 160,620 | Australia | Feb. 4, 1954 |